United States Patent
Inoshita

(10) Patent No.: US 10,873,689 B2
(45) Date of Patent: Dec. 22, 2020

(54) INFORMATION PROCESSING APPARATUS, INFORMATION PROCESSING METHOD, AND INFORMATION PROCESSING PROGRAM

(71) Applicant: NEC CORPORATION, Tokyo (JP)

(72) Inventor: Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/498,046

(22) PCT Filed: Mar. 31, 2017

(86) PCT No.: PCT/JP2017/013773
§ 371 (c)(1),
(2) Date: Sep. 26, 2019

(87) PCT Pub. No.: WO2018/179402
PCT Pub. Date: Oct. 4, 2018

(65) Prior Publication Data
US 2020/0029004 A1 Jan. 23, 2020

(51) Int. Cl.
*H04N 7/18* (2006.01)
*H04N 5/232* (2006.01)
(Continued)

(52) U.S. Cl.
CPC .......... *H04N 5/232* (2013.01); *G05D 1/0094* (2013.01); *H04N 5/2257* (2013.01);
(Continued)

(58) Field of Classification Search
CPC .. H04N 5/225; H04N 5/2258; H04N 5/23238; H04N 5/2621; H04N 5/23206;
(Continued)

(56) References Cited

U.S. PATENT DOCUMENTS

2010/0049367 A1* 2/2010 Yang .................... E01D 19/106
700/259
2011/0098056 A1 4/2011 Rhoads et al.
(Continued)

FOREIGN PATENT DOCUMENTS

CN 103394199 A 11/2013
CN 103797798 A 5/2014
(Continued)

OTHER PUBLICATIONS

Communication dated Feb. 7, 2020, from the European Patent Office in European Application No. 17904329.4.
(Continued)

*Primary Examiner* — Robert Chevalier
(74) *Attorney, Agent, or Firm* — Sughrue Mion, PLLC

(57) ABSTRACT

Concerning a partial area image that constitutes a wide area image, to measure an elapsed time from a past point of time of image capturing and control a flying body in accordance with the elapsed time, an information processing apparatus includes a wide area image generator that extracts, from a flying body video obtained when a flying body captures a ground area spreading below while moving, a plurality of video frame images and combines the video frame images, thereby generating a captured image in a wide area, an elapsed time measurer that measures an elapsed time from an image capturing time by the flying body for each of the plurality of video frame images, and an output unit that outputs the elapsed time for each video frame image together with position information of the flying body at the time of capturing of the video frame image.

8 Claims, 7 Drawing Sheets

(51) Int. Cl.
*G05D 1/00* (2006.01)
*H04N 5/225* (2006.01)
*H04N 5/262* (2006.01)
*A63H 27/00* (2006.01)

(52) U.S. Cl.
CPC ......... *H04N 5/2258* (2013.01); *H04N 5/2621* (2013.01); *A63H 27/12* (2013.01)

(58) Field of Classification Search
CPC .... H04N 5/2257; H04N 5/232; G05D 1/0094; A63H 27/12; B64C 2201/123; B64C 2201/127; B64C 2201/141
USPC ........ 348/144, 143, 148, 149, 151, 152, 153
See application file for complete search history.

(56) References Cited

U.S. PATENT DOCUMENTS

2013/0176423 A1* 7/2013 Rischmuller ........ G05D 1/0038
348/114
2014/0267723 A1 9/2014 Davidson, Jr. et al.

FOREIGN PATENT DOCUMENTS

| | | |
|---|---|---|
| CN | 105631773 A | 6/2016 |
| CN | 106204443 A | 12/2016 |
| CN | 106461391 A | 2/2017 |
| JP | 2012-242321 A | 12/2012 |
| JP | 2013-139256 A | 7/2013 |
| JP | 2017-46328 A | 3/2017 |
| WO | 2015/199772 A2 | 12/2015 |
| WO | 2016/033123 A1 | 3/2016 |

OTHER PUBLICATIONS

Jimmy Perron et al., "A Hybrid Approach Based on Multi-Agent Geosimulation and Reinforcement Learning to Solve a UAV Patrolling Problem", Proceedings of the 2008 Winter Simulation Conference, Dec. 7, 2008, pp. 1259-1267 (9 pages total).
International Search Report for PCT/JP2017/013773 dated Jun. 27, 2017 [PCT/ISA/210].
Communication dated Jul. 30, 2020, from the China National Intellectual Property Administration in Application No. 201780088560.9.

* cited by examiner

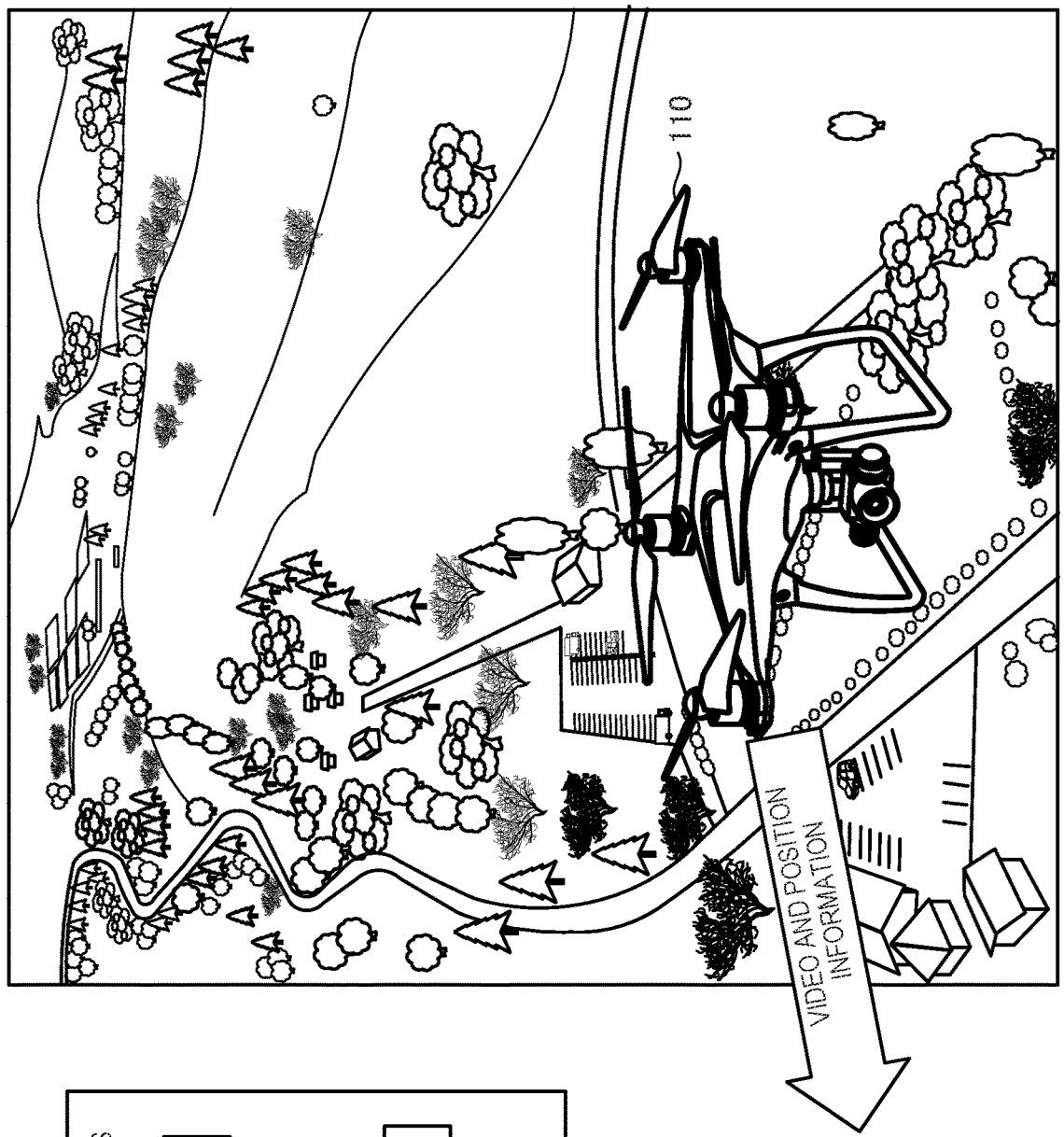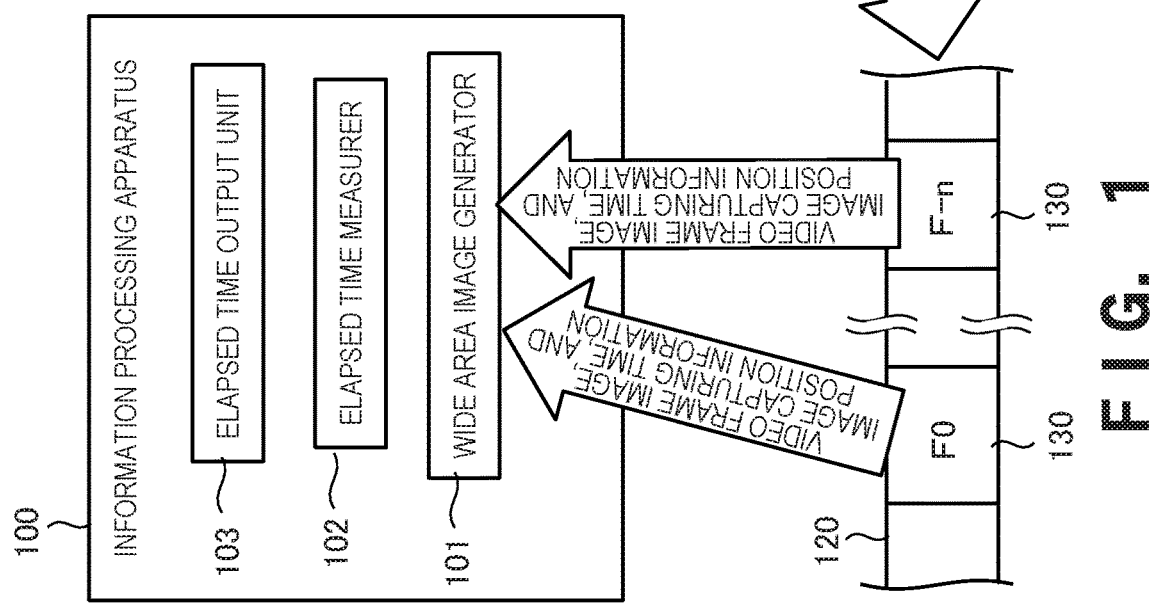
FIG. 1

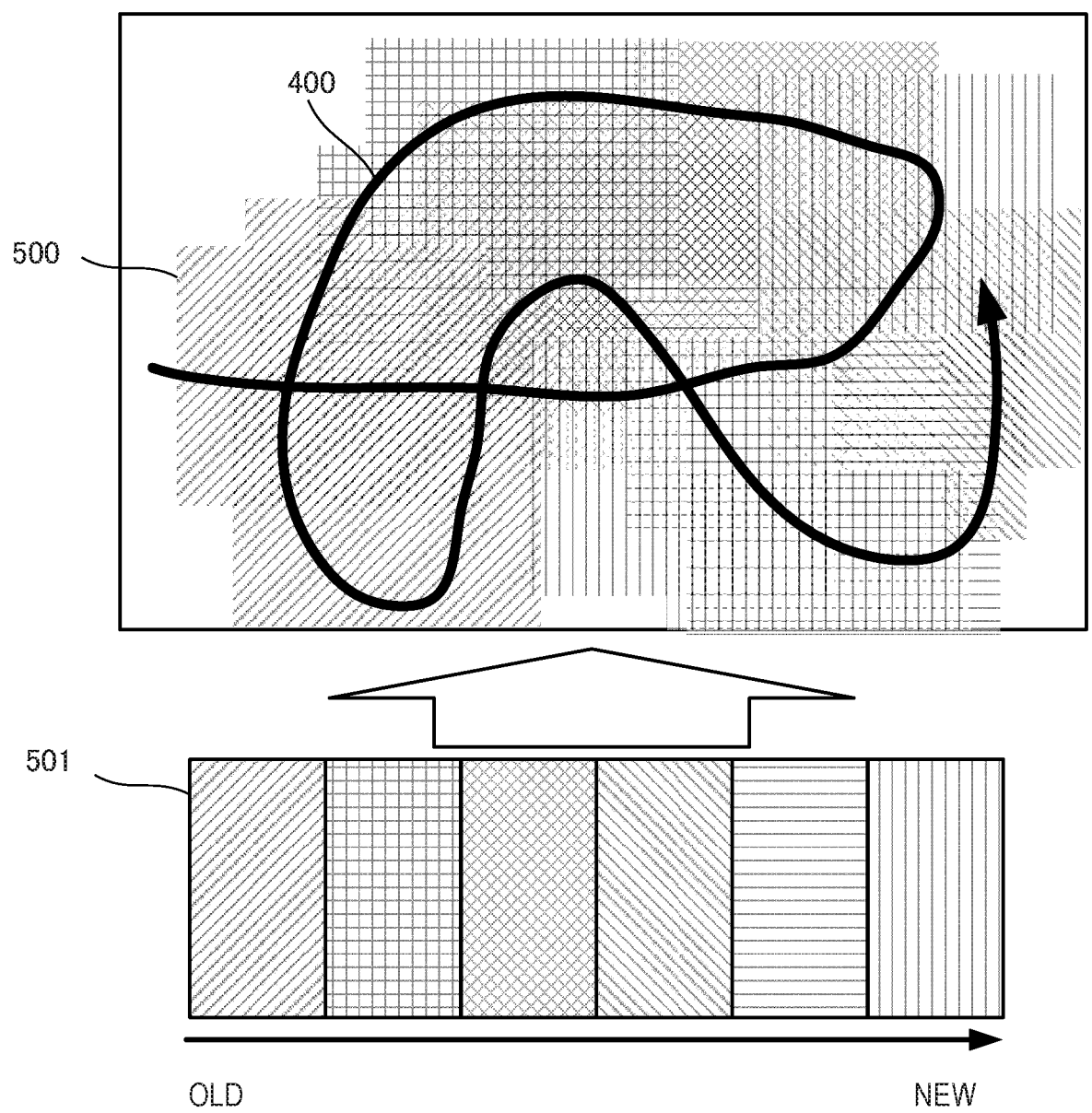
F I G. 5

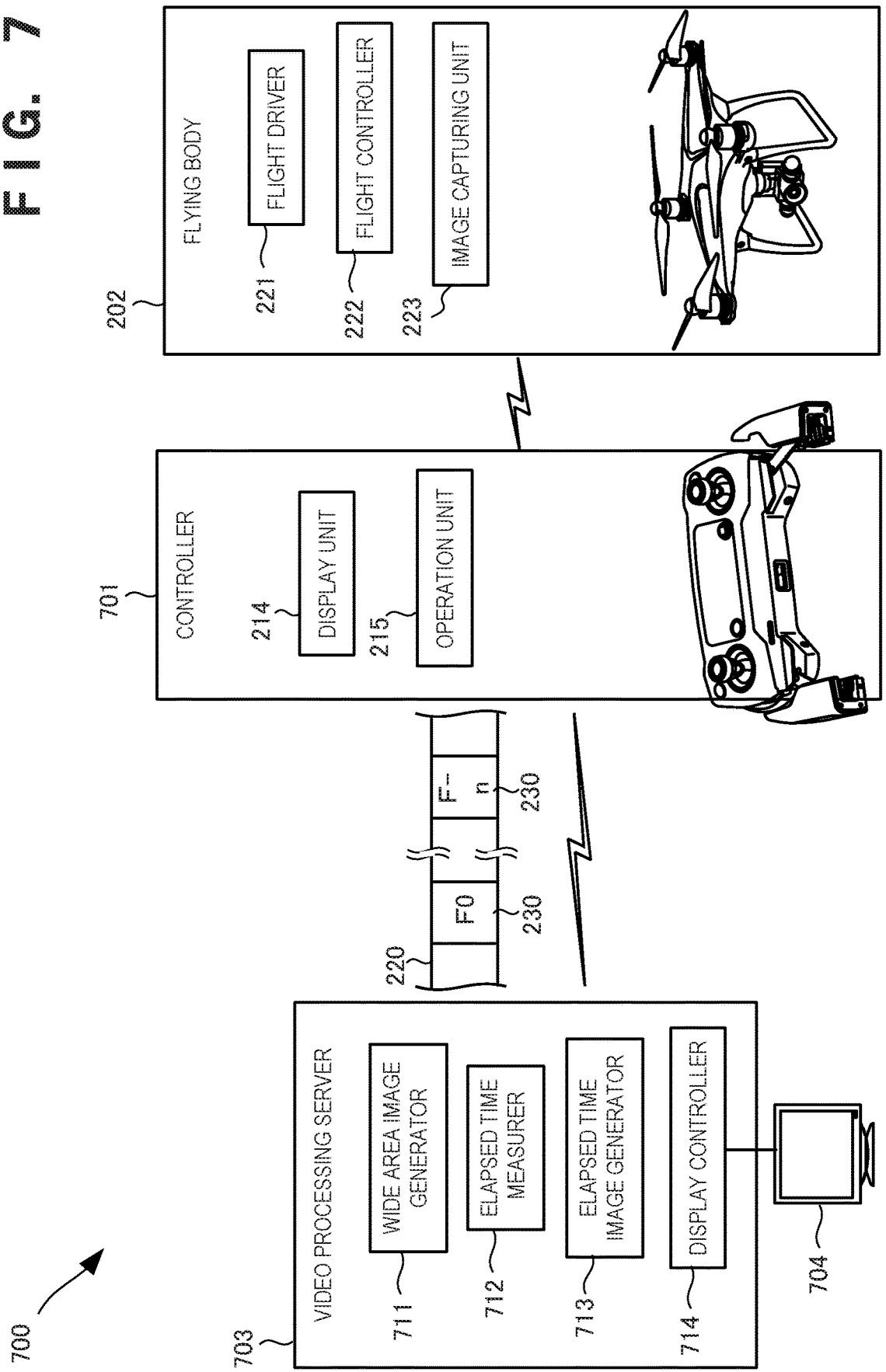

INFORMATION PROCESSING APPARATUS, INFORMATION PROCESSING METHOD, AND INFORMATION PROCESSING PROGRAM

CROSS REFERENCE TO RELATED APPLICATIONS

This application is a National Stage of International Application No. PCT/JP2017/013773, filed on Mar. 31, 2017.

TECHNICAL FIELD

The present invention relates to an information processing apparatus, an information processing method, and an information processing program.

BACKGROUND ART

In the above technical field, patent literature 1 discloses a technique of acquiring a wide area image by a radio aircraft.

CITATION LIST

Patent Literature

Patent literature 1: Japanese Patent Laid-Open No. 2017-46328

SUMMARY OF THE INVENTION

Technical Problem

However, the technique described in the above literature cannot perform flight control according to an elapsed time from a past point of time of image capturing.

The present invention enables to provide a technique of solving the above-described problem.

Solution to Problem

One example aspect of the present invention provides an apparatus comprising:

a wide area image generator that extracts, from a flying body video obtained when a flying body captures a ground area spreading below while moving, a plurality of video frame images and combines the video frame images, thereby generating a captured image in a wide area;

an elapsed time measurer that measures an elapsed time from an image capturing time by the flying body for each of the plurality of video frame images; and an output unit that outputs the elapsed time for each video frame image together with position information of the flying body at the time of capturing of the video frame image.

Another example aspect of the present invention provides a method comprising:

combining a plurality of images included in a flying body video obtained when a flying body captures an area spreading below while moving, using a position of the flying body and an image feature at the time of image capturing, thereby generating a captured image in a wide area;

calculating an elapsed time from an image capturing time by the flying body for each captured image area in the wide range; and outputting the elapsed time for each captured image area.

Still other example aspect of the present invention provides a program for causing a computer to execute a method, comprising: combining a plurality of images included in a flying body video obtained when a flying body captures an area spreading below while moving, using a position of the flying body and an image feature at the time of image capturing, thereby generating a captured image in a wide area;

calculating an elapsed time from an image capturing time by the flying body for each captured image area in the wide range; and outputting the elapsed time for each captured image area.

Advantageous Effects of Invention

According to the present invention, concerning a partial area image that constitutes a wide area image, it is possible to measure the elapsed time from the past point of time of image capturing and control the flying body in accordance with the elapsed time.

BRIEF DESCRIPTION OF DRAWINGS

FIG. 1 is a block diagram showing the arrangement of an information processing apparatus according to the first example embodiment of the present invention;

FIG. 5 is a view for explaining the display image of the information processing apparatus according to the second example embodiment of the present invention;

FIG. 7 is a block diagram showing the arrangement of an information processing apparatus according to the third example embodiment of the present invention.

DESCRIPTION OF EXAMPLE EMBODIMENTS

Figure 2:
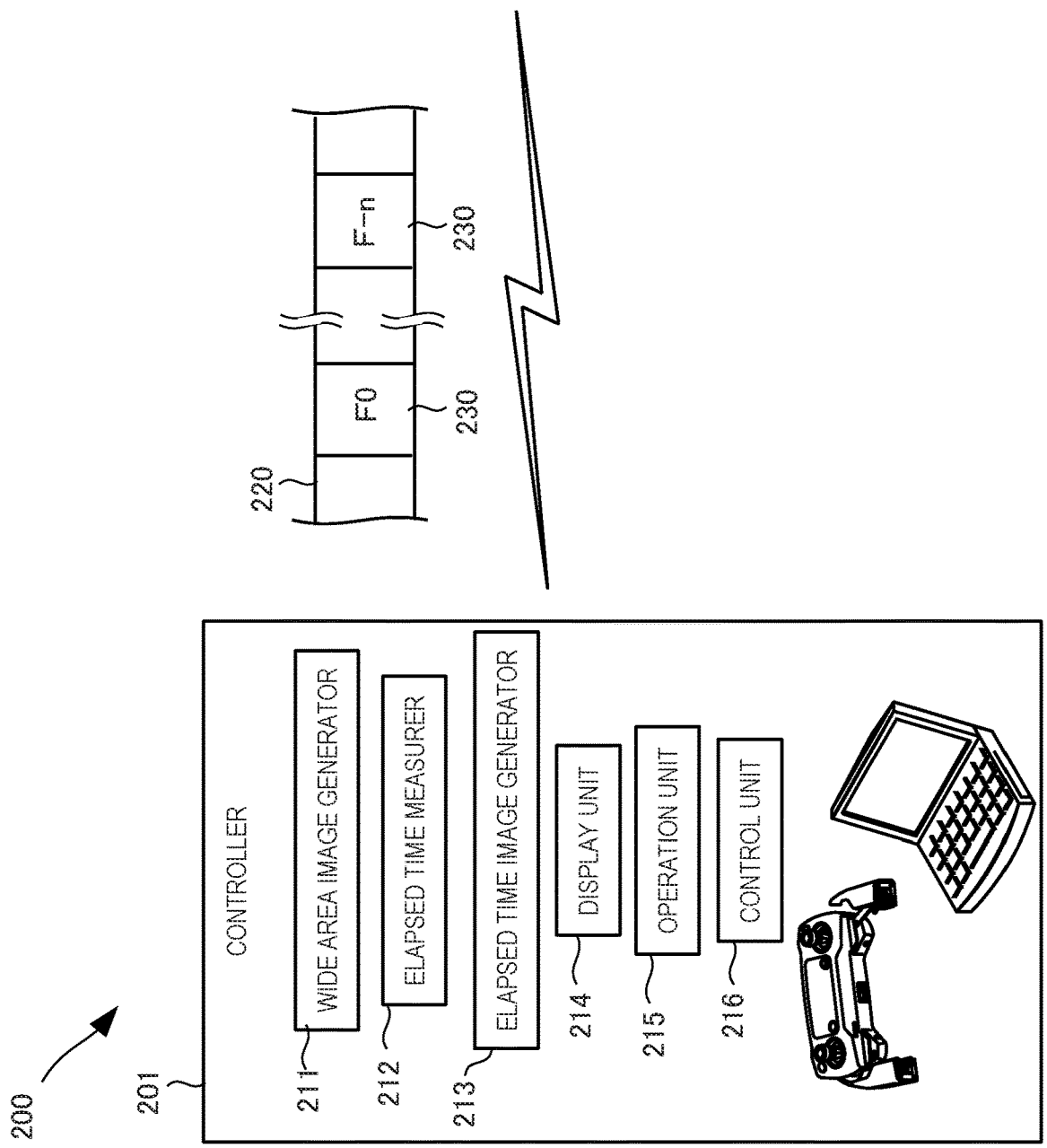
FIG. 2 is a block diagram showing the arrangement of an information processing apparatus according to the second example embodiment of the present invention.

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise. Note that in the following explanation, a "flying body" is a so-called drone, which is an unmanned aircraft (UAV (Unmanned Aerial Vehicle)) capable of flying by remote control or autonomous control.

First Example Embodiment

An information processing apparatus 100 according to the first example embodiment of the present invention will be described with reference to FIG. 1. The information processing apparatus 100 is an apparatus configured to perform flight control according to an elapsed time from an image capturing time by a flying body.

As shown in FIG. 1, the information processing apparatus 100 includes a wide area image generator 101, an elapsed time measurer 102, and an elapsed time output unit 103.

The wide area image generator 101 extracts, from a flying body video 120 obtained when a flying body 110 captures a ground area spreading below while moving, a plurality of video frame images 130 and combines them, thereby generating a captured image in a wide area.

The elapsed time measurer 102 measures the elapsed time from the image capturing time by the flying body 110 for each video frame image 130.

The elapsed time output unit 103 outputs the elapsed time for each video frame image 130 together with the position information of the flying body 110 at the time of capturing of the video frame image 130.

According to the above-described arrangement, concerning a partial area image that constitutes a wide area image, it is possible to measure the elapsed time from the past point of time of image capturing and control the flying body in accordance with the elapsed time.

Second Example Embodiment

An information processing system according to the second example embodiment of the present invention will be described next with reference to FIG. 2 and subsequent views. FIG. 2 is a view for explaining an information processing system including a controller 201 saving as an information processing apparatus according to this example embodiment and a flying body 202.

The controller 201 is a device having a calculation capability such as a so-called transmitter for radio-controlled toys or a notebook PC, and includes a wide area image generator 211, an elapsed time measurer 212, an elapsed time image generator 213, a display unit 214, an operation unit 215, and a control unit 216. The flying body 202 includes a flight driver 221 including a propeller and a motor, a flight controller 222 that controls the flight driver 221, and an image capturing unit 223 that captures a video.

The wide area image generator 211 extracts, from a flying body video 220 obtained when the flying body 202 captures a ground area spreading below while moving, a plurality of video frame images 230 and combines them, thereby generating a captured image in a wide area. When combining the plurality of video frame images 230, selection, position adjustment, and the like of the images 230 are performed using the latitude/longitude, azimuth, and image feature at the time of image capturing.

Figure 3:
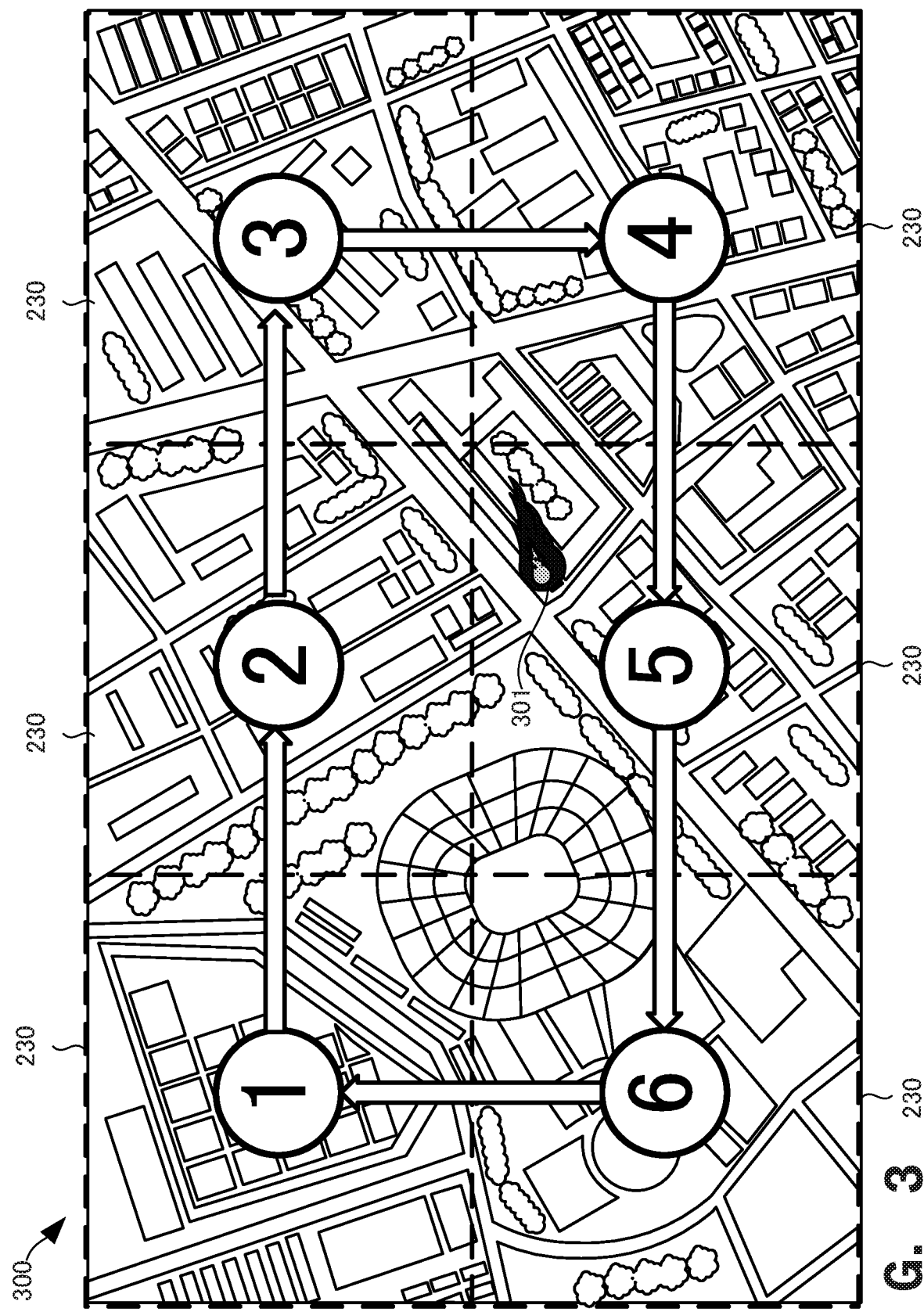
FIG. 3 is a view showing a display image of the information processing apparatus according to the second example embodiment of the present invention.

For example, a wide area image 300 generated in this way is shown in FIG. 3. The partial images 230 obtained when the flying body 202 captures positions indicated by (1) to (6) while moving are combined, thereby generating the wide area image 300.

Figure 4:
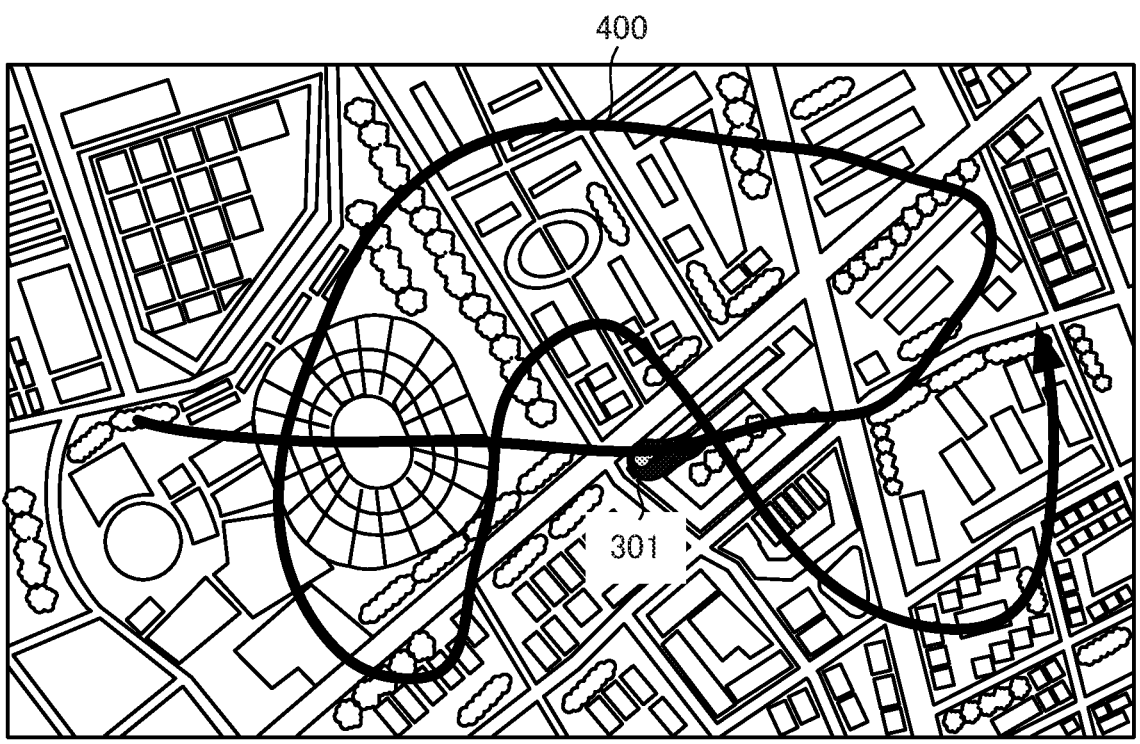
FIG. 4 is a view for explaining the display image of the information processing apparatus according to the second example embodiment of the present invention.

The elapsed time measurer 212 measures the relative time between the image capturing time and the current time, that is, the elapsed time from the point of time of image capturing for each video frame image 230. A case in which the wide area image is generated by moving to the organized positions (1) to (6) has been described with reference to FIG. 3. When capturing an area on the periphery of a place where a fire 301 has broken out, it is not necessarily best to fly organized positions. As indicated by an arrow 400 in FIG. 4, the flying body may fly on the periphery of the fire 301 at random.

At this time, the elapsed time image generator 213 combines the elapsed time for each video frame image with the position information of the flying body 202 at the time of capturing of the video frame image, thereby generating a gradation image. More specifically, a gradation image representing the difference of the elapsed time as the difference of the color or a change in the depth of the color is generated for each partial area included in the wide area image.

FIG. 5 is a view showing a gradation image 500 as one example. As indicated by an image 501, the depth of the color is changed sequentially from an old partial image to a new partial image, thereby generating the gradation image 500.

The display unit 214 may display the gradation image 500 superimposed on the wide area image 300, may display them in parallel, or may selectively display one of them.

The operation unit 215 accepts an operation by the user, and sends a control instruction to the flight controller 222 of the flying body 202.

In addition, the control unit 216 accepts the elapsed time for each video frame image from the elapsed time measurer 212, decides the moving route of the flying body 202 in accordance with the elapsed time for each video frame image, and transmits it to the flight controller 222. That is, the control unit 216 specifies the oldest video frame image for which the elapsed time from the past image capturing time is longest, and preferentially moves the flying body to the position at which the oldest video frame image was captured.

Figure 6:
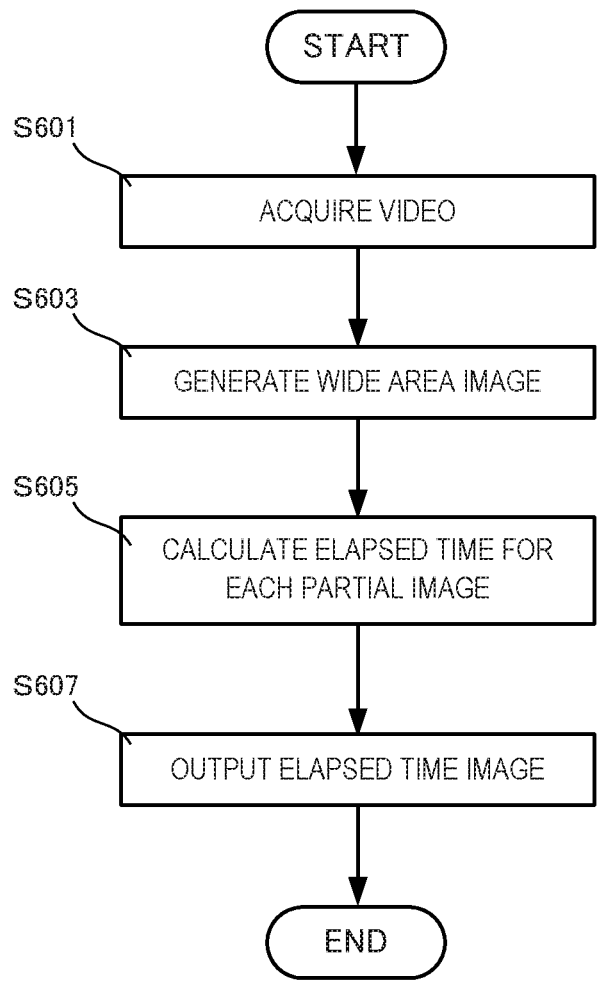
FIG. 6 is a flowchart showing the procedure of processing of the information processing apparatus according to the second example embodiment of the present invention.

FIG. 6 is a flowchart showing the procedure of processing of the controller 201. First, in step S601, captured video data is acquired from the flying body 202. Next, in step S603, a plurality of video frame images are extracted from the video data, and the plurality of video frame images are combined to generate a wide area image.

Furthermore, in step S605, the elapsed time for each partial image included in the wide area image is measured. Then, in step S607, a gradation image of the elapsed time is generated using the elapsed time for each partial image and a flying body position at which the partial image was captured. Alternatively, at this time, as the next destination, the flying body is made to fly to a position at which a partial image of a long elapsed time was captured.

According to the above-described arrangement, concerning a partial area image that constitutes a wide area image, it is possible to measure the elapsed time from the past point of time of image capturing and control the flying body in accordance with the elapsed time.

Third Example Embodiment

An information processing system 700 according to the third example embodiment of the present invention will be described next with reference to FIG. 7. FIG. 7 is a functional block diagram for explaining the schematic arrangement of the information processing system 700 according to this example embodiment. The information processing system 700 according to this example embodiment includes a video processing server 703 and a display 704, and a controller 701 does not include a wide area image generator 211, and the like, unlike the second example embodiment. The rest of the components and operations is the same as in the second example embodiment. Hence, the same reference numerals denote the same components and operations, and a detailed description thereof will be omitted.

A wide area image generator 711 of the video processing server 703 acquires a flying body video 220 via the controller 701, extracts a plurality of video frame images 230 from the flying body video 220, and combines the video frame images 230, thereby generating a captured image in a wide range. When combining the plurality of video frame images 230, selection, position adjustment, and the like of the video frame images 230 are performed using the latitude/longitude, azimuth, and image feature at the time of image capturing.

An elapsed time measurer 712 measures the elapsed time from the point of time of image capturing for each video frame image 230.

An elapsed time image generator 713 combines the elapsed time for each video frame image 230 with the position information of a flying body 202 at the time of capturing of the video frame image, thereby generating a gradation image.

A display controller 714 outputs the generated gradation image to the display 704.

The display 704 may display the gradation image superimposed on the wide area image, may display them in parallel, or may selectively display one of them.

According to the above-described arrangement, concerning a partial area image that constitutes a wide area image, it is possible to measure the elapsed time from the past point of time of image capturing and visualize the elapsed time. It is also possible to control the flying body 202 using the controller 701 while viewing the visualized elapsed time.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. An information processing apparatus comprising:
a wide area image generator that extracts, from a flying body video obtained when a flying body captures a ground area spreading below while moving, a plurality of video frame images and combines the video frame images, thereby generating a captured image in a wide area;
an elapsed time measurer that measures an elapsed time from an image capturing time by the flying body for each of the plurality of video frame images; and
an output unit that outputs an image representing a difference of the elapsed time as a difference of color for each partial area included in the captured image in the wide area together with a moving route of the flying body.

2. The information processing apparatus according to claim 1, wherein the output unit comprises a display unit that displays an elapsed time image representing the elapsed time together with the captured image.

3. The information processing apparatus according to claim 1, wherein the output unit comprises a display unit that displays an elapsed time image representing the elapsed time superimposed on the captured image.

4. The information processing apparatus according to claim 2, wherein the elapsed time image is an image representing a length of the elapsed time by a different color.

5. The information processing apparatus according to claim 2, wherein the elapsed time image is an image representing a length of the elapsed time by a change in a depth of a color.

6. An information processing apparatus comprising:
a wide area image generator that extracts, from a flying body video obtained when a flying body captures a ground area spreading below while moving, a plurality of video frame images and combines the video frame images, thereby generating a captured image in a wide area;
an elapsed time measurer that measures an elapsed time from an image capturing time by the flying body for each of the plurality of video frame images; and
a controller that controls the flying body by deciding a moving route of the flying body and updates an oldest video frame image for which the elapsed time from a past image capturing time is longest.

7. An information processing method comprising:
extracting, from a flying body video obtained when a flying body captures a ground area spreading below while moving, a plurality of video frame images and combining the video frame images, thereby generating a captured image in a wide area;
measuring an elapsed time from an image capturing time by the flying body for each of the plurality of video frame images; and
outputting an image representing a difference of the elapsed time as a difference of color for each partial area included in the captured image in the wide area together with moving route of the flying body.

8. A non-transitory computer readable medium on which is stored an information processing program for causing a computer to execute a method, the method comprising:
extracting, from a flying body video obtained when a flying body captures a ground area spreading below while moving, a plurality of video frame images and combining the video frame images, thereby generating a captured image in a wide area;
measuring an elapsed time from an image capturing time by the flying body for each of the plurality of video frame images; and
outputting an image representing a difference of the elapsed time as a difference of color for each partial area included in the captured image in the wide area together with a moving route of the flying body.

* * * * *